US009652131B2

(12) United States Patent
Pugh et al.

(10) Patent No.: US 9,652,131 B2
(45) Date of Patent: May 16, 2017

(54) DIRECTIONAL SELECTION

(71) Applicant: Microsoft Technology Licensing, LLC, Redmond, WA (US)

(72) Inventors: David E. Pugh, Bellevue, WA (US); Paul van Brenk, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 317 days.

(21) Appl. No.: 13/717,714

(22) Filed: Dec. 18, 2012

(65) Prior Publication Data

US 2014/0173527 A1    Jun. 19, 2014

(51) Int. Cl.
*G06F 3/0484*    (2013.01)
*G06F 3/0488*    (2013.01)

(52) U.S. Cl.
CPC ................ *G06F 3/04842* (2013.01)

(58) Field of Classification Search
CPC .... G06F 3/0484; G06F 3/04892; G06F 3/044; G06F 3/0488
USPC ........ 715/856, 862, 243, 800, 711; 345/173, 345/619, 157; 726/1
See application file for complete search history.

(56) References Cited

U.S. PATENT DOCUMENTS

| | | | |
|---|---|---|---|
| 5,565,887 A * | 10/1996 | McCambridge .... | G06F 3/04892 345/157 |
| 5,832,528 A | 11/1998 | Kwatinetz et al. | |
| 6,240,430 B1 | 5/2001 | Deike et al. | |
| 6,392,675 B1 * | 5/2002 | Becker et al. ................. | 715/858 |
| 6,874,126 B1 * | 3/2005 | Lapidous ....................... | 715/711 |
| 6,903,723 B1 * | 6/2005 | Forest ....................... | A61F 4/00 345/157 |
| 7,346,894 B1 * | 3/2008 | Cook ........................... | 717/121 |
| 7,394,453 B2 * | 7/2008 | Woolley .................. | G06F 3/044 345/157 |
| 7,554,522 B2 | 6/2009 | Sinclair, II et al. | |
| 7,770,135 B2 * | 8/2010 | Fitzmaurice .................. | 715/856 |
| 8,082,497 B2 * | 12/2011 | Salesin et al. ................ | 715/255 |
| 8,487,956 B2 * | 7/2013 | Morita et al. .................. | 345/619 |
| 8,522,157 B2 * | 8/2013 | Park ............................. | 715/786 |
| 8,619,026 B2 * | 12/2013 | Jeong ............................. | 345/157 |
| 8,683,547 B2 * | 3/2014 | Apparao et al. .................. | 726/1 |

(Continued)

OTHER PUBLICATIONS

"Edit Control Text Operations", Retrieved at <<http://msdn.microsoft.com/en-us/library/windows/desktop/bb775460 (v=vs.85).aspx#selecting_text>>, May 9, 2012, pp. 1-6.

(Continued)

*Primary Examiner* — Li Sun
*Assistant Examiner* — Jasmine Wan
(74) *Attorney, Agent, or Firm* — Lee & Hayes, PLLC

(57) ABSTRACT

A "safe zone" can be created within which the effect of the actual cursor position is overridden when selecting content. The start position and the end position of the selection can be compared. If the selection is a forward selection but the cursor position has moved upwards, the vertical component of the cursor position is overridden by the vertical position of the cursor at the start of the selection. If the selection is a reverse selection but the cursor position has moved downwards, the vertical component of the cursor position is overridden by the vertical position of the cursor at the start of the selection. The safe zone can have any kind of shape.

14 Claims, 8 Drawing Sheets

(56) References Cited

U.S. PATENT DOCUMENTS

| | | | |
|---|---|---|---|
| 8,712,024 B2* | 4/2014 | Perler et al. | 379/142.06 |
| 2001/0040587 A1 | 11/2001 | Scheck | |
| 2002/0097270 A1* | 7/2002 | Keely et al. | 345/764 |
| 2004/0240735 A1 | 12/2004 | Medina | |
| 2008/0074389 A1 | 3/2008 | Beale | |
| 2008/0168388 A1* | 7/2008 | Decker | 715/800 |
| 2008/0168402 A1* | 7/2008 | Blumenberg | G06F 3/04845 715/863 |
| 2009/0109182 A1 | 4/2009 | Fyke et al. | |
| 2009/0167700 A1* | 7/2009 | Westerman et al. | 345/173 |
| 2009/0228842 A1 | 9/2009 | Westerman et al. | |
| 2010/0293460 A1 | 11/2010 | Budelli | |
| 2012/0102401 A1 | 4/2012 | Ijas et al. | |
| 2012/0235791 A1* | 9/2012 | Donlan et al. | 340/10.1 |
| 2013/0042202 A1* | 2/2013 | Mikami et al. | 715/781 |
| 2013/0067373 A1* | 3/2013 | Weir et al. | 715/769 |
| 2013/0117662 A1* | 5/2013 | Shan et al. | 715/243 |
| 2013/0285930 A1* | 10/2013 | Thorsander | G06F 3/0488 345/173 |

OTHER PUBLICATIONS

Findlater, et al., "Enhanced Area Cursors: Reducing Fine Pointing Demands for People with Motor Impairments", Retrieved at <<http://faculty.washington.edu/wobbrock/pubs/uist-10.pdf>>, In 23nd annual ACM symposium on User interface software and technology, Oct. 3, 2010, pp. 153-162.

Trewin, et al., "Developing Steady Clicks: A Method of Cursor Assistance for People with Motor Impairments", Retrieved at <<https://www.cs.washington.edu/education/courses/590w/06au/resources/p26-trewin.pdf>>, In 8th international ACM SIGACCESS conference on Computers and accessibility, Oct. 22, 2006, pp. 26-33.

"Guide for Individuals with Dexterity and Mobility Impairments", Retrieved at <<https://www.microsoft.com/enable/guides/dexterity.aspx>>, Aug. 4, 2011, pp. 1-5.

* cited by examiner

DIRECTIONAL SELECTION

BACKGROUND

In many computer programs, selecting content involves the use of a cursor control device such as a mouse, touchpad, or a finger or stylus if using a touch screen. Selecting content is an example of a user operation that can be difficult under certain circumstances. As an example, to select 25 characters from a long line of text sometimes requires the cursor to move about 400 pixels horizontally without drifting more than about 10 pixels above or below the center of the line. This is difficult to do under the best circumstances and can be impossible for users with impaired dexterity.

SUMMARY

A "safe zone" can be created within which the vertical position of the cursor is overridden to the vertical position of the line on which the selection started when selecting content. The shape of the "safe zone" can be a triangle, rectangle, ellipse, trapezoid, ellipse, parabola or any shape. In general, the "safe zone" extends either above and to the right, or below and to the left of the cursor's initial position.

When the user is selecting content on a single line, the cursor's current position is compared with its initial position to see if it is within the "safe zone." If it is, then the cursor's vertical position is ignored and content is selected as if the cursor was located at a location defined by its current horizontal position and its initial vertical position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

It can be difficult to select a portion of content under certain circumstances. One such circumstance is, for example, when the line of content is wider than the width of the viewer, the viewer is horizontally scrolled to the right and the lines of content surrounding the selected content are short. One reason that selection under these circumstances can be problematic is that if the cursor position drifts off the long line, the traditional behavior of the viewer is to extend the selection to the adjacent line, causing the viewer to scroll to the left. This means it is difficult to resume extending the selection because, before the selection can be extended, the view has to be scrolled back to the right. Simply returning the cursor to its original position does not result in returning to the original selection, as is the case when approximately equal-length lines exist. Situations in which a long line is surrounded by shorter lines is common in integrated development environments but can be an issue in any situation in which the user is making a selection, particularly within content organized into distinct lines.

It can be difficult to select a portion of content under circumstances in which fine motor control is difficult, for example, for those with impaired dexterity because of a medical condition or because of an environmental condition. It can also be difficult for those with unimpaired dexterity. In accordance with aspects of the subject matter described herein, a "safe zone" is created in which cursor movements determined likely to be involuntary are overridden when selecting content.

Directional Selection

Figure 1A:
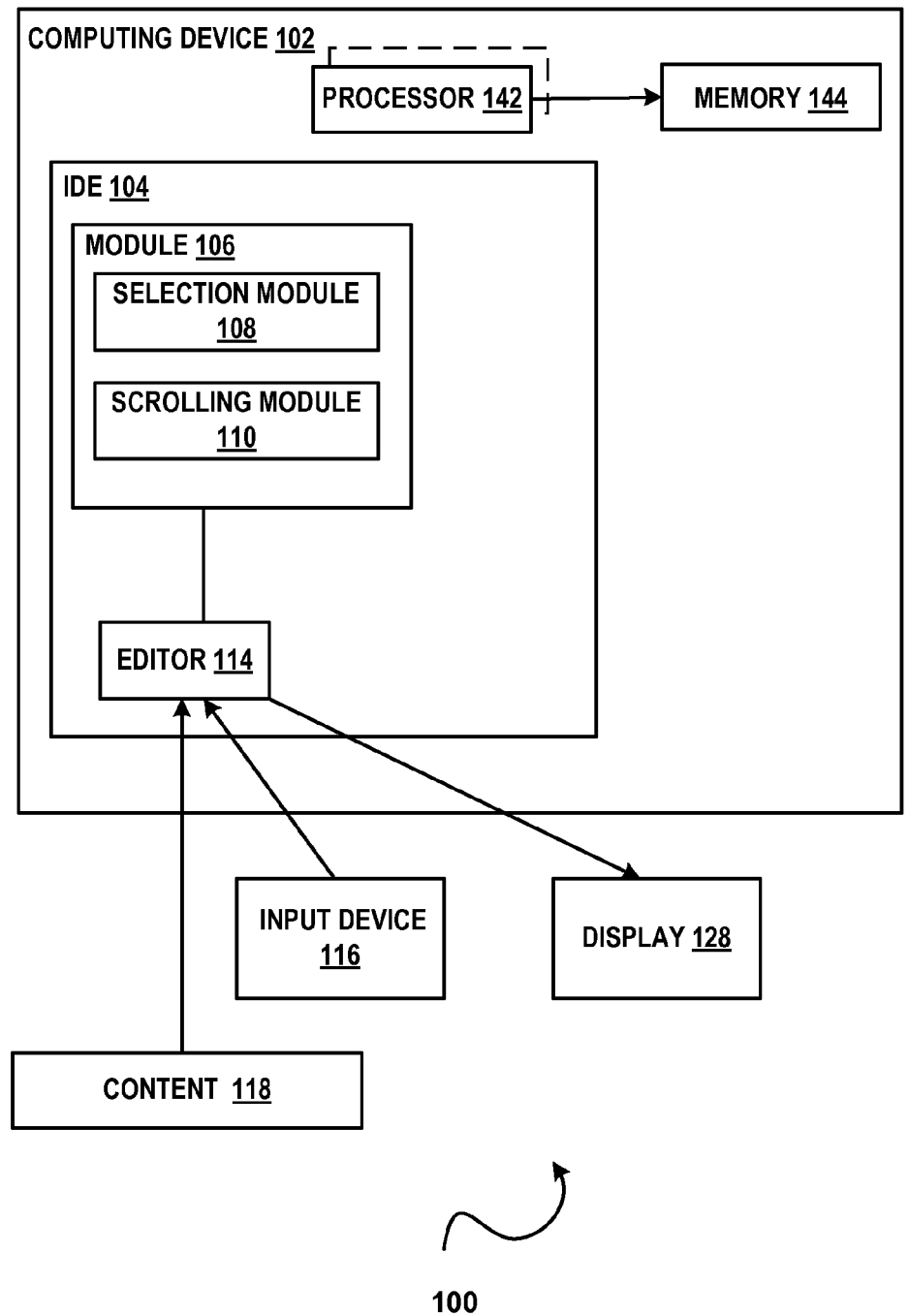
FIG. 1a illustrates an example of a system 100 that creates a "safe zone" in accordance with aspects of the subject matter described herein.

FIG. 1a illustrates a block diagram of an example of a system 100 that creates a "safe zone" in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 may execute in whole or in part on a software development computer such as the software development computer described with respect to FIG. 4. All or portions of system 100 may be operated upon by program development tools. For example, all or portions of system 100 may execute within an integrated development environment (IDE) such as for example IDE 104. IDE 104 may be an IDE as described more fully with respect to FIG. 4 or can be another IDE. System 100 can execute wholly or partially outside an IDE.

System 100 can include one or more computing devices such as, for example, computing device 102. A computing device such as computing device 102 can include one or more processors such as processor 142, etc., and a memory such as memory 144 connected to the one or more processors. Computing device 102 can include one or more modules such as module 106, etc. that creates a "safe zone" as described more fully herein. It will be appreciated that the one or more modules 106, etc. that create a "safe zone" can be loaded into memory 144 to cause one or more processors such as processor 142, etc. to perform the actions attributed to the one or more modules 106, etc. that create a "safe zone". System 100 can include any combination of one or more of the following: an editor, viewer, reader, command window or browser such as but not limited to editor 114, an input device such as input device 116 and/or a display device such as display device 128. Other components well known in the arts may also be included but are not here shown.

Editor 114 may be a hex editor for editing binary data, an HTML editor for editing web pages, an MS-DOS Editor, a plain-text editor for MS-DOS and Microsoft Windows, a source code editor for editing source code, a text editor for editing plain text, a visual editor, an editing program that displays text on-screen as it is edited, a word processor, for producing and editing any sort of printable material, a WYSIWYG editor for editing and visualizing formatted text or graphics, an XML editor, an interactive design time source code editor or any other editor. Editor 114 by itself or in conjunction with a parser, may be capable of parsing any programming language(s) including C# (CSharp), Visual Basic, C, C++, Java, Ruby, Perl, Python, Fortran, Cobol, JavaScript, F# (FSharp), Scala or any other programming language now known or developed in the future. Editor 114 may, for example, receive program source code and display it on display device 128. Content such as content 118 can be loaded into editor 114. Content 118 can be program source code, text, numbers, a combination of text or numbers, a document or any other content that can be displayed or otherwise provided in tangible form. Editor 114 may receive user input from input device 116. Input device 116 can be a cursor control device such as a mouse, touchpad, finger, stylus, joystick, gaze tracking device, motion sensing device or any cursor control device.

One or more modules such as module 106, etc. that create a "safe zone" can include any combination of one or more of: a selection module that creates a "safe zone" for content selection such as selection module 108, and/or a scrolling module such as scrolling module 110 that creates a "safe zone" for scrolling. Selection module 108 and/or scrolling module 110 can receive input via input device 116. Selection module 108 and/or scrolling module 110 can receive input (e.g. content) directly via input device 116 or indirectly (e.g., via editor 114).

Suppose that the content loaded into an editor includes a short line of content followed by a long line of content followed by another short line of content. Suppose further that the long line of content is long enough so that the viewpoint of the editor has to be scrolled to the right in order to see the end of the line of content. Now suppose a selection operation selects a portion of the long line of content. The traditional behavior of known editors determines the starting position of the cursor for the selection and the line number of the selection and finds the closest character on that line to the cursor by converting a position of the cursor in the display to a position in the content. If the cursor is now moved to a line above the selection, the position found by converting the position of the cursor in the display to a position in the content will be at the end of the earlier short line. Because the view is scrolled to the right, in order to display where the cursor is on the previous short line the viewpoint is scrolled back to the left in order to show the end of that short line of content. Moreover, the direction of the selection may be changed from a left-to-right (forward) selection to a right-to-left (reverse) selection. The selection of content is changed from the initial selection to a selection that starts at the end of the previous short line of content. Thus, a gesture that is potentially as small as moving a cursor device one pixel, can cause a transition that is probably unwanted and from which it may not be easy to recover.

Figure 1B:
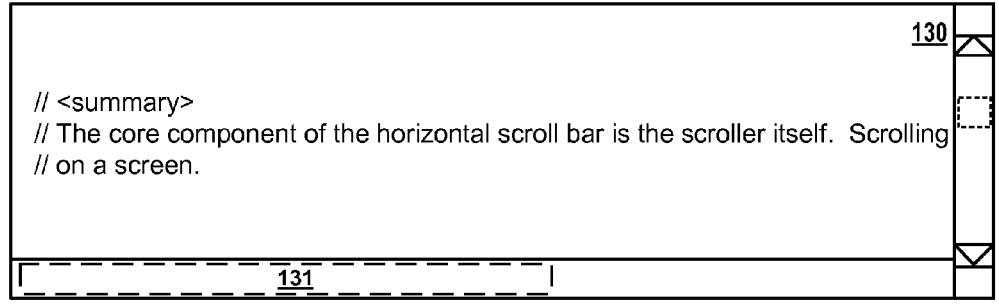
FIG. 1b illustrates an example of content loaded into an editor wherein the horizontal scroll bar is scrolled to the left.
Figure 1C:
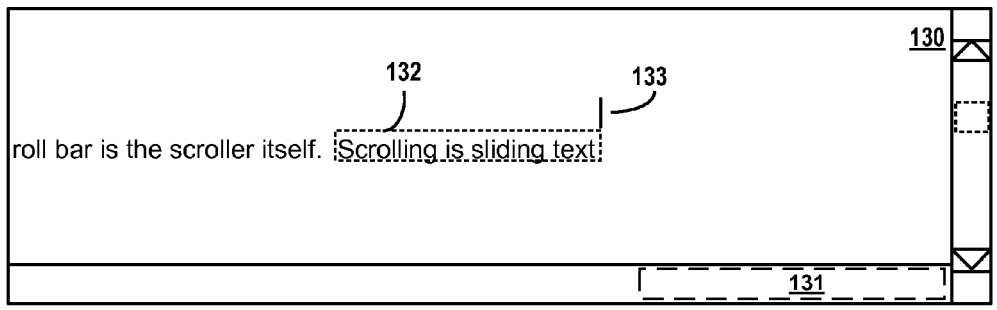
FIG. 1c illustrates the example of content loaded into the editor of FIG. 1b wherein the horizontal scroll bar is scrolled to the right and a portion of the content has been selected.
Figure 1D:
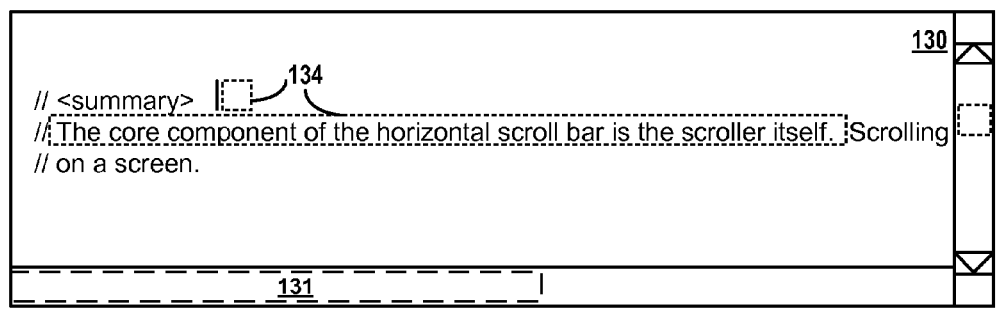
FIG. 1d illustrates an example of a traditional result of the cursor moving to a previous line following selection of the content selected in FIG. 1c.

FIGS. 1b, 1c and 1d illustrate the above. FIG. 1b illustrates an example of content 130 loaded into an editor, viewer, etc. such as editor 114. The content loaded into the editor is:

```
// <summary>
//The core component of the horizontal scroll bar is the scroller itself.
Scrolling is sliding text
//on a screen.
```

The first line of the content is:
　　//<summary>
The second line of the content is:
　　//The core component of the horizontal scroll bar is the scroller itself. Scrolling is sliding text
The third line of the content is:
　　//on a screen.

Suppose that because of the size of the view window of the editor, the entire second line is not visible. What appears in a typical editor that is not wrap-enabled, as illustrated in line 2 of FIG. 1b is only the beginning of line 2, namely:
　　//The core component of the horizontal scroll bar is the scroller itself. Scrolling
The rest of line 2 of the content is truncated in the view. To be able to see the rest of the line, the horizontal scroll bar 131 can be dragged to the right, as illustrated in FIG. 1c. By scrolling to the right, the part of line 2 not visible in FIG. 1b, namely:
　　is sliding text
is visible but now the beginning part of line 2 is no longer visible. Now suppose a user selects a portion of line 2, namely:
　　Scrolling is sliding text
(selection 132).

Now suppose the cursor 133 drifts off line 2 onto line 1. The traditional result of this series of operations is illustrated in FIG. 1d. The horizontal scroll bar 131 is automatically (without operation of the user) scrolled back to the left and the selected content becomes:
　　//The core component of the horizontal scroll bar is the scroller itself.
selection 134. This is content that was not selected and the direction of selection was reversed. Moreover, in traditional editors, merely returning the cursor to its previous location on line 2 will not result in reselection of the original selection.

Thus, in accordance with aspects of the subject matter described herein, instead of automatically scrolling the horizontal scroll bar back to the left and automatically changing the selection, the vertical component of the drifted cursor is overridden by the location of the line on which the selection was initiated. If the horizontal location of the cursor is unchanged, the selection remains what the user actually selected before the cursor moved off the line. For example, the selection remains:

Scrolling is sliding text
selection 132, as illustrated in FIG. 1c.

If the cursor's horizontal location changes, the selection changes correspondingly. For example, suppose a selection begins at horizontal position 32 (x-coordinate) and vertical position 320 (y-coordinate). Suppose the coordinates of the initial selection position are (32, 320). Suppose text is selected from (32, 320) to (94, 320). Suppose the cursor then drifts upwards so that its current position is (94, 290). In accordance with aspects of the subject matter described herein, the content selected would be from (32, 320) to (94, 320), the current y-coordinate of the cursor is overridden by the coordinate position of the line of the initial selection. Now suppose that the cursor drifted upwards and to the right so that the current position of the cursor is (100, 290). The content selected would be from (32, 320) to (100, 320), the current y-coordinate overridden by the coordinate position of the line of the initial selection and the current x-coordinate position of the cursor.

Figure 1E:
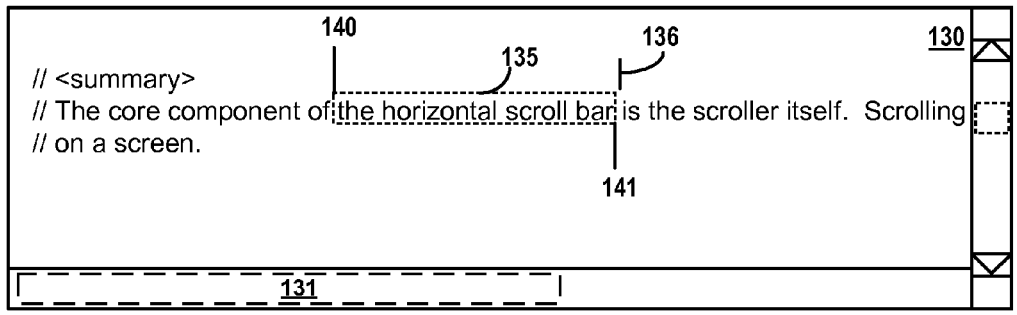
FIG. 1e illustrates the example of content loaded into the editor of FIG. 1b wherein the horizontal scroll bar is scrolled to the left and a portion of the content has been selected.
Figure 1F:
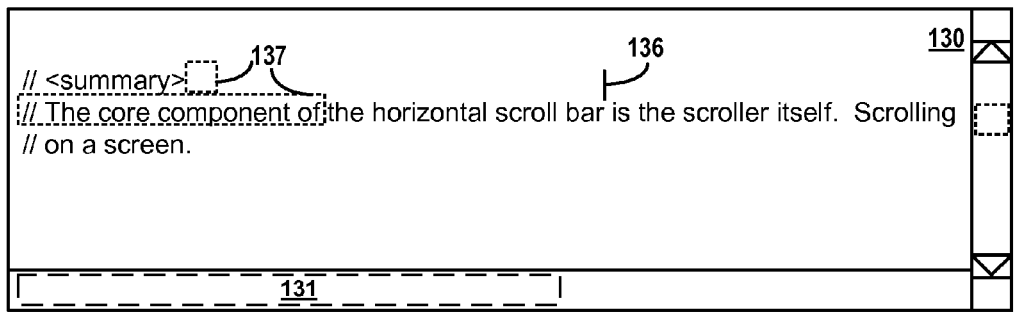
FIG. 1f illustrates an example of a traditional result of the cursor moving to a later line following selection of the content selected in FIG. 1e.

It will be appreciated that although the example provided involves a user operation that scrolled the horizontal scroll bar 131 to the right, as illustrated in FIG. 1c, the concept described herein also applies to a selection such as selection 135 as illustrated in FIG. 1e where the horizontal scroll bar 131 is not scrolled to the right. That is, as illustrated in FIG. 1f, in a traditional editor selection 135 is changed to selection 137 because of the movement of the cursor 136 to a previous line.

In accordance with some aspects of the subject matter described herein, in response to a user operation selecting content in a forward direction (i.e., selecting content in a left-to-right direction), the beginning position of the selection is determined by the start position of the selection operation (e.g., position 140 of FIG. 1e). If the cursor moves to a previous line the vertical position of the cursor is overridden and the selection is extended as if the cursor were moving over the line on which the selection started. That is, if the cursor moves to a previous line, the end position of the selection operation is determined to be the end position of the cursor as if the cursor were moving over the line on which the selection started (e.g., position 141 of FIG. 1e).

Thus, a "safe zone" in which the effect of a cursor movement on selection of content is overridden can be established for forward selections in which the cursor moves to a previous line. If however, the cursor moves to a later line, the traditional behavior is retained. A "safe zone" in which the effect of cursor movement on selection of content is overridden can be established for forward selections in which the cursor moves to a previous line.

When selecting content in a reverse direction, the logic is reversed. In response to a user operation selecting content in a reverse direction (i.e. selecting content in a right-to-left direction), the beginning position of the selection is determined by the start position of the selection operation (e.g., position 141 of FIG. 1e). If subsequently the cursor moves to a later line the movement of the cursor to the later line is overridden. For example, suppose a selection begins at horizontal position 94 (x-coordinate) and vertical position 320 (y-coordinate). Suppose the coordinates of the initial selection position are therefore (94, 320). Suppose text is selected from (94, 320) to (32, 320). Suppose the cursor then drifts upwards so that its current position is (32, 290). The content selected would be from (94, 320) to (32, 320), the current x-coordinate of the cursor but the current y-coordinate overridden by the coordinate position of the line of the initial selection.

Now suppose that the cursor drifted upwards and to the right so that the current position of the cursor is (40, 290). The content selected would be from (94, 320) to (40, 320), the current y-coordinate overridden by the coordinate position of the line of the initial selection. A "safe zone" in which cursor movements are ignored thus can be established for reverse selections in which the cursor moves to a later line. If however, the cursor moves to a previous line, the traditional behavior is retained.

Figure 1G:
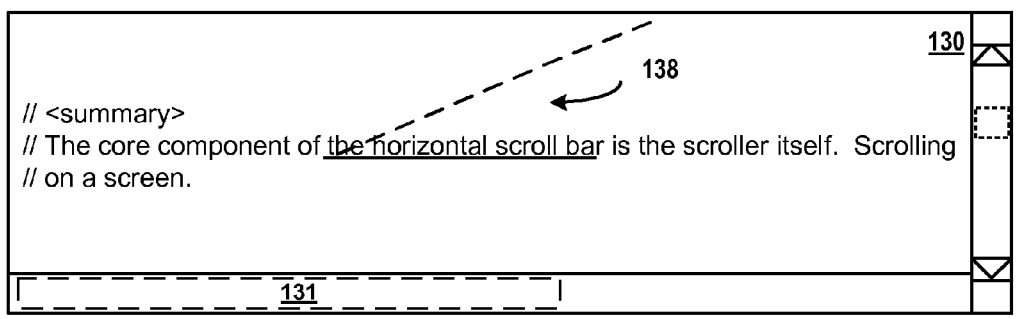
FIG. 1g illustrates an example of a "safe zone" for a forward selection in accordance with aspects of the subject matter disclosed herein.
Figure 1H:
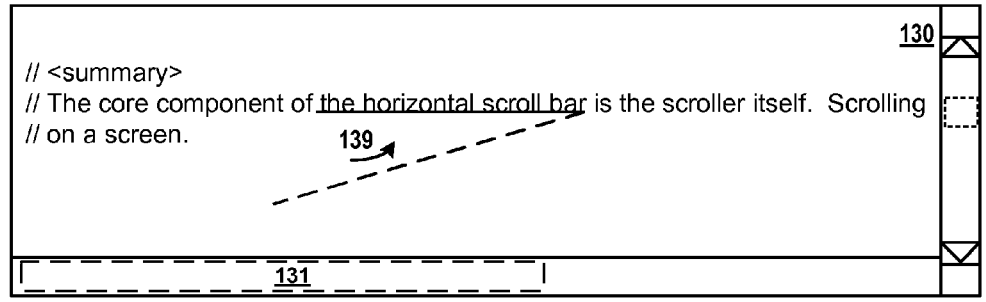
FIG. 1h illustrates an example of a "safe zone" for a reverse selection in accordance with aspects of the subject matter disclosed herein.
Figure 1I:
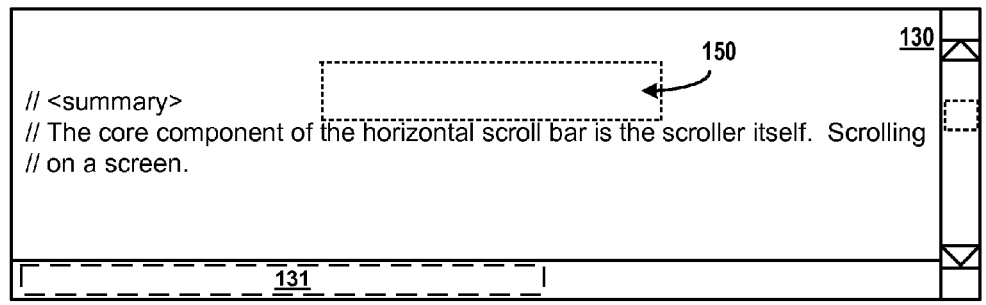
FIG. 1i illustrates another example of a "safe zone" for a forward selection in accordance with aspects of the subject matter disclosed herein.
Figure 1J:
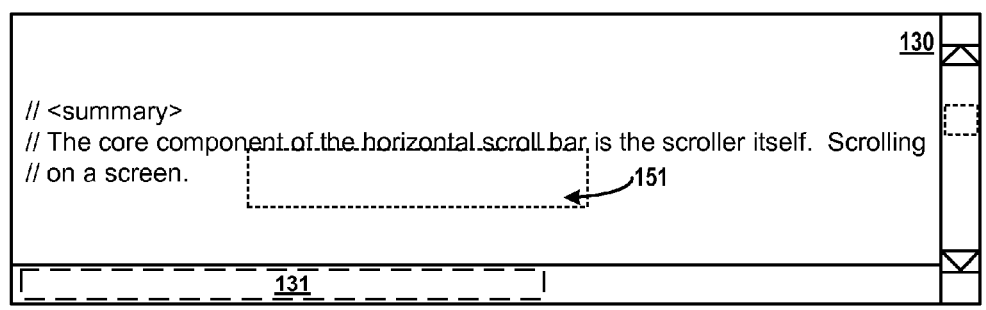
FIG. 1j illustrates another example of a "safe zone" for a reverse selection in accordance with aspects of the subject matter disclosed herein.

In accordance with aspects of the subject matter described herein, a "safe zone" of any shape can be created. For example, for a forward selection a "safe zone" can be created that extends from the start position of the cursor at a specified angle (e.g., 30 degrees) in the direction of the selection. An example of a forward "safe zone" is shown in FIG. 1g, area 138. Cursor movements within the triangular safe zone area 138 are overridden as described more fully above. For a reverse selection, the logic can be reversed. FIG. 1h illustrates an example of a triangular safe zone area 139 for a reverse selection. It will be appreciated that a rectangular "safe zone" is also contemplated. An example of another forward "safe zone" is shown in FIG. 1i, area 150. Cursor movements within the rectangular safe zone area 150 are overridden as described more fully above. For a reverse selection, the logic can be reversed. FIG. 1j illustrates an example of a rectangular safe zone area 151 for a reverse selection.

It will be appreciated that although creation of a "safe zone" in which the result of cursor movement on content selection is altered within the "safe zone" is described within the context of content selection, the "safe zone" concept can be applied to cursor movements made within the context of scrolling operations.

Figure 2A:
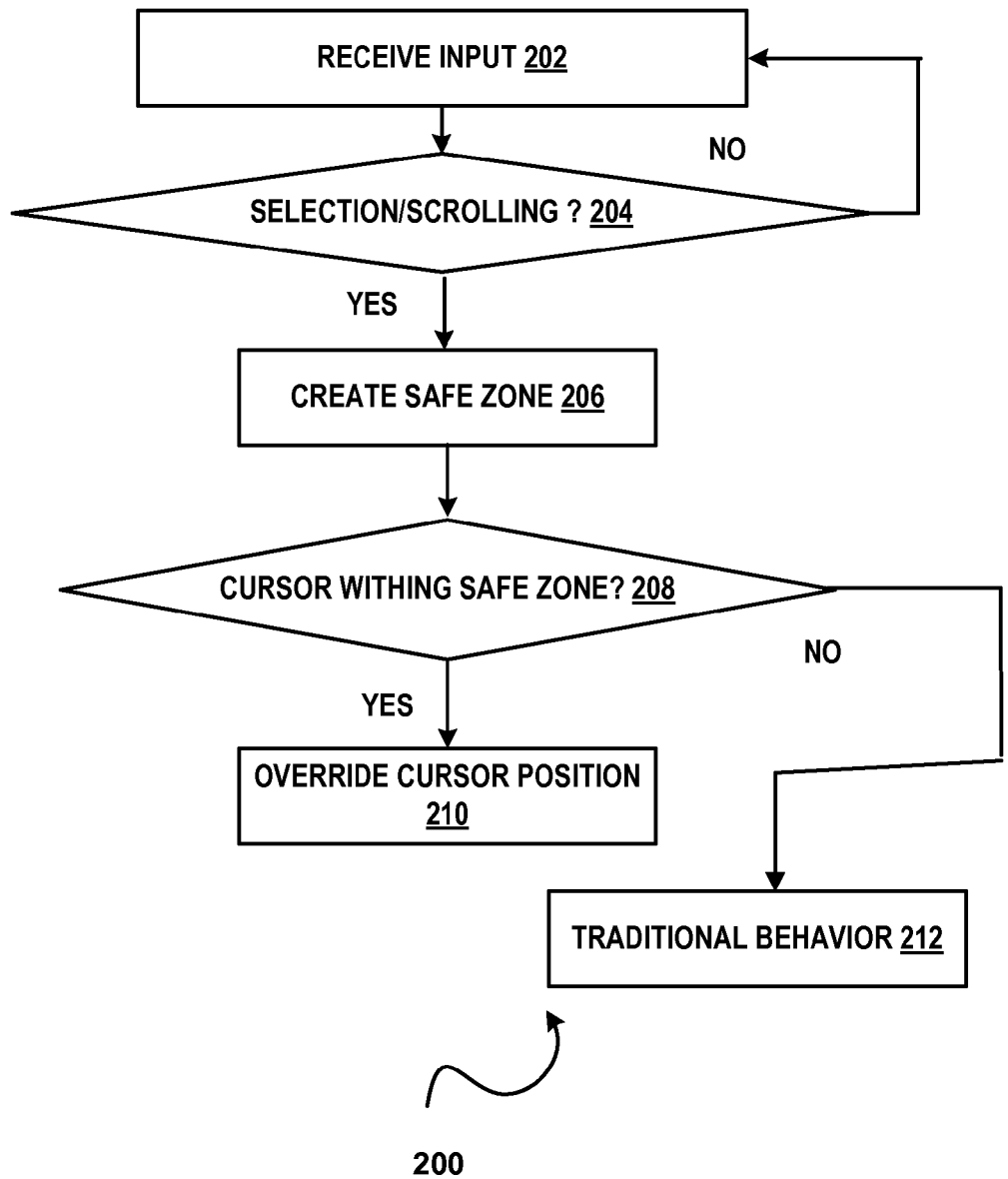
FIG. 2a illustrates an example of a method 200 that creates a "safe zone" in accordance with aspects of the subject matter disclosed herein.

FIG. 2a illustrates an example of a method 200 that can create a safe zone in accordance with aspects of the subject matter disclosed herein. The method described in FIG. 2a can be practiced by a system such as but not limited to the one described with respect to FIG. 1a and/or FIG. 1b and for which examples were provided in FIGS. 1b through 1j. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

Figure 2B:
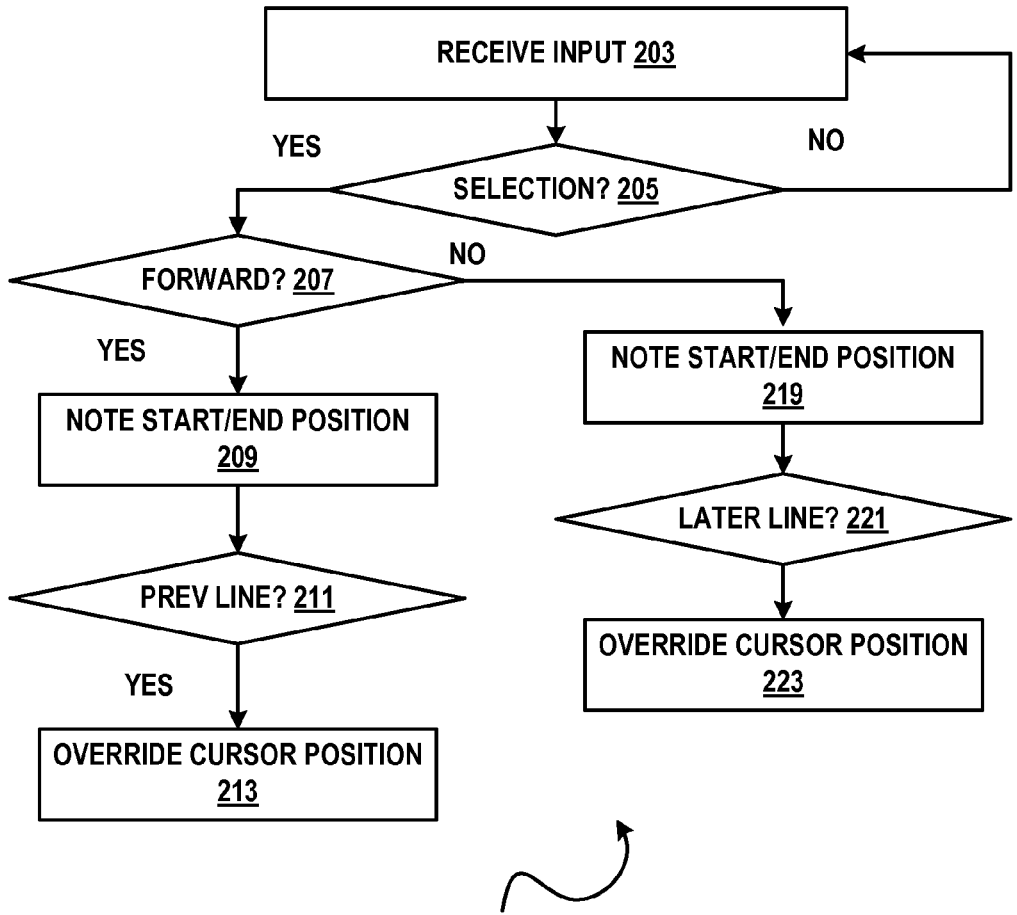
FIG. 2b illustrates another example of a method 201 that creates a "safe zone" in accordance with aspects of the subject matter disclosed herein.

At operation 202 an input can be received. At operation 204, if the input is a selection or scrolling operation, processing can continue at operation 206. At operation 204 if the input is not a selection or scrolling operation, processing can return to operation 202. At operation 206 a "safe zone" as described more fully above can be created. At operation 208 if the cursor is within the safe zone, at 210 the effect of the cursor position can be overridden as described more fully above. At operation 208 if the cursor is not within the "safe zone", traditional behavior ensues at operation 212. FIG. 2b illustrates a more detailed example of a method 201 that can create a safe zone in accordance with aspects of the subject matter disclosed herein.

FIG. 2b illustrates another example of a method 201 that can create a safe zone in accordance with aspects of the subject matter disclosed herein. The method described in FIG. 2b can be practiced by a system such as but not limited to the one described with respect to FIG. 1a and for which examples were provided in FIGS. 1b through 1j. While method 201 describes a series of operations that are performed in a sequence, it is to be understood that method 201 is not limited by the order of the sequence. For instance, some operations may occur in a different order than that described. In addition, one operation may occur concurrently with another operation. In some instances, not all operations described are performed.

At operation 203 an input can be received. At operation 205, if the input is a selection, processing can continue at operation 207. At operation 205 if the input is not a selection operation, processing can return to operation 203. At operation 207 the selection can be determined to be a forward selection or a reverse selection, as described more fully above. At operation 209, in response to determining that the selection is a forward selection at operation 207, the start and end position of the selection on one or more lines can be noted at 209. At operation 211, if the cursor is determined to have moved to a previous line, the effect of the actual cursor position is overridden at operation 213, as described more fully above. At operation 219, in response to determining that the selection is a reverse selection at operation 207, the start and end position of the selection on one or more lines can be noted. At operation 221, if the cursor is determine to have moved to a later line, the effect of the current cursor position on the selection can be overridden at operation 223 as described more fully above.

Example of a Suitable Computing Environment

Figure 3:
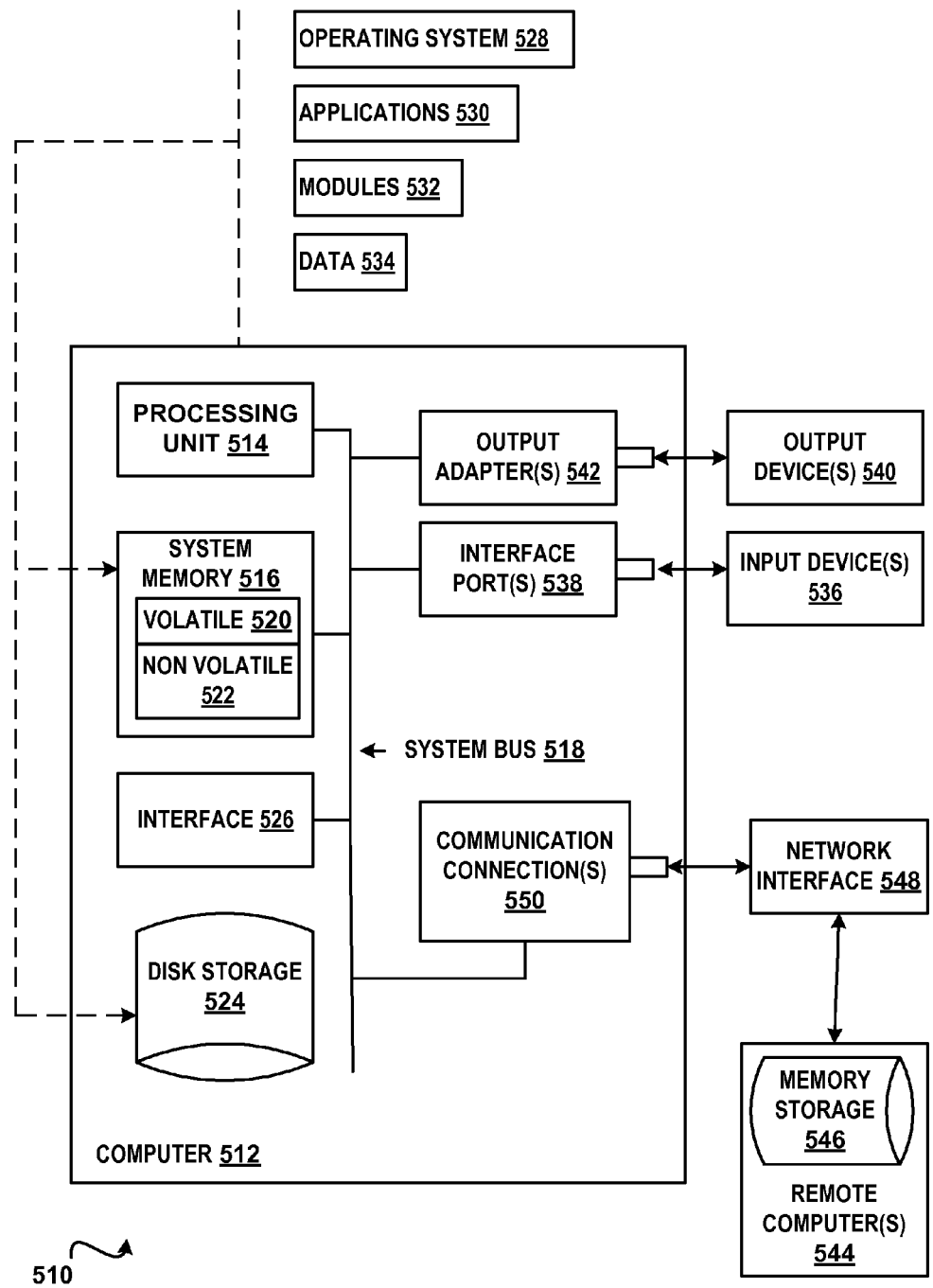
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
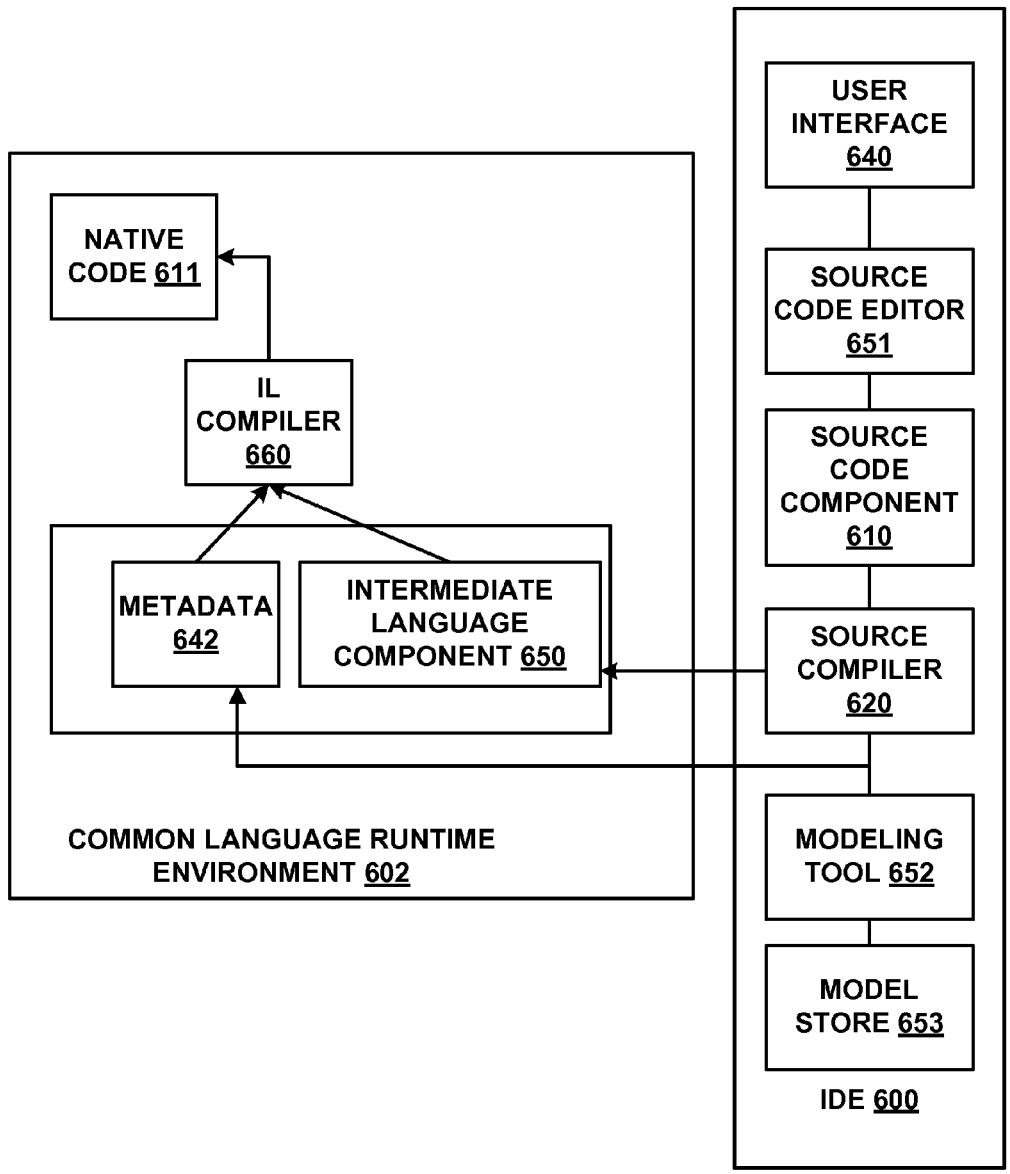
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, M L, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft .NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
  a processor;
  a memory connected to the processor;
  an input device configured to receive input comprising a selection operation for selecting textual content, the selection operation comprising movement of a cursor from an initial position to a current position of the cursor; and
  a module that when loaded into the processor causes the processor to:
    create a safe zone associated with the selection operation, wherein the safe zone extends above the initial position if the cursor if the selection operation is from left to right, or below the initial position of the cursor if the selection operation is from right to left, so that cursor movement within the safe zone confines a selection of textual content associated with the selection operation to a line of textual content, a position of the line corresponding to the initial position; and override a vertical location component of the current position of the cursor during the selection operation with a corresponding vertical location component of the initial position of the cursor, when the current position of the cursor is within the safe zone.

2. The system of claim 1, wherein a shape of the safe zone is a rectangle.

3. The system of claim 1, wherein an effect of the location component of the current position of the cursor comprises changing a view of the textual content, and wherein an effect of overriding the location component of the current position of the cursor does not change a view of the textual content.

4. The system of claim 1, wherein an effect of the location component of the current position of the cursor comprises changing the textual content selected, and wherein an effect of overriding the location component of the current position of the cursor does not change the textual content selected.

5. The system of claim 1, wherein a shape of the safe zone is a triangle.

6. A method comprising:
receiving by an input of a computing device a selection operation selecting a portion of textual content, the selection operation associated with an initial position and a current position of a cursor used for the selection operation;
determining by a processor of the computing device whether the selection operation is a left-to-right selection or a right-to-left selection;
creating by the processor a safe zone associated with the selection operation based at least in part on whether the selection operation is a left-to-right selection or a right-to-left selection, the safe zone extending above the initial position of the cursor if the selection operation from left to right, or below the initial position of the cursor if the selection operation is from right to left; and
overriding by the processor a location component of the current position of the cursor with a corresponding location component of the initial position of the cursor, when the current position of the cursor is within the safe zone.

7. The method of claim 6, further comprising:
determining that the selection operation is the right-to-left selection; and
in response to the determining, creating the safe zone to comprise a triangle extending below the selection.

8. The method of claim 6, wherein a shape of the safe zone is a rectangle.

9. The method of claim 6, wherein a shape of the safe zone is a triangle.

10. A method comprising:
receiving, by an input of a computing device, a selection operation for selecting a line of textual content, the selection operation including movement of a cursor from an initial position to a current position of the cursor;
creating, by a processor of the computing device, a safe zone associated with the selection operation, wherein the safe zone extends above the initial position of the cursor if the selection operation is from left to right, or below the initial position of the cursor if the selection operation is from right to left, so that cursor movement within the safe zone confines a selection associated with the selection operation to a line corresponding to a vertical component of the initial position; and
overriding, by the processor, a vertical component of the current position of the cursor during the selection operation with the vertical component of the initial position of the cursor, when the current position of the cursor is within the safe zone.

11. The method of claim 10, wherein a shape of the safe zone is rectangular.

12. The method of claim 10, wherein a shape of the safe zone is triangular.

13. The method of claim 10,
further comprising overriding, by the processor, an effect of changing a view of the line of content with an effect of not changing the view of the line of content.

14. The system of claim 1, wherein the location component of the initial position of the cursor comprises a first x-coordinate, and the safe zone comprises a first end with a location having a second x-coordinate that corresponds to the first x-coordinate, and the safe zone comprises a second end with a location having a third x-coordinate that is spaced apart from the first x-coordinate.

* * * * *